UNITED STATES PATENT OFFICE.

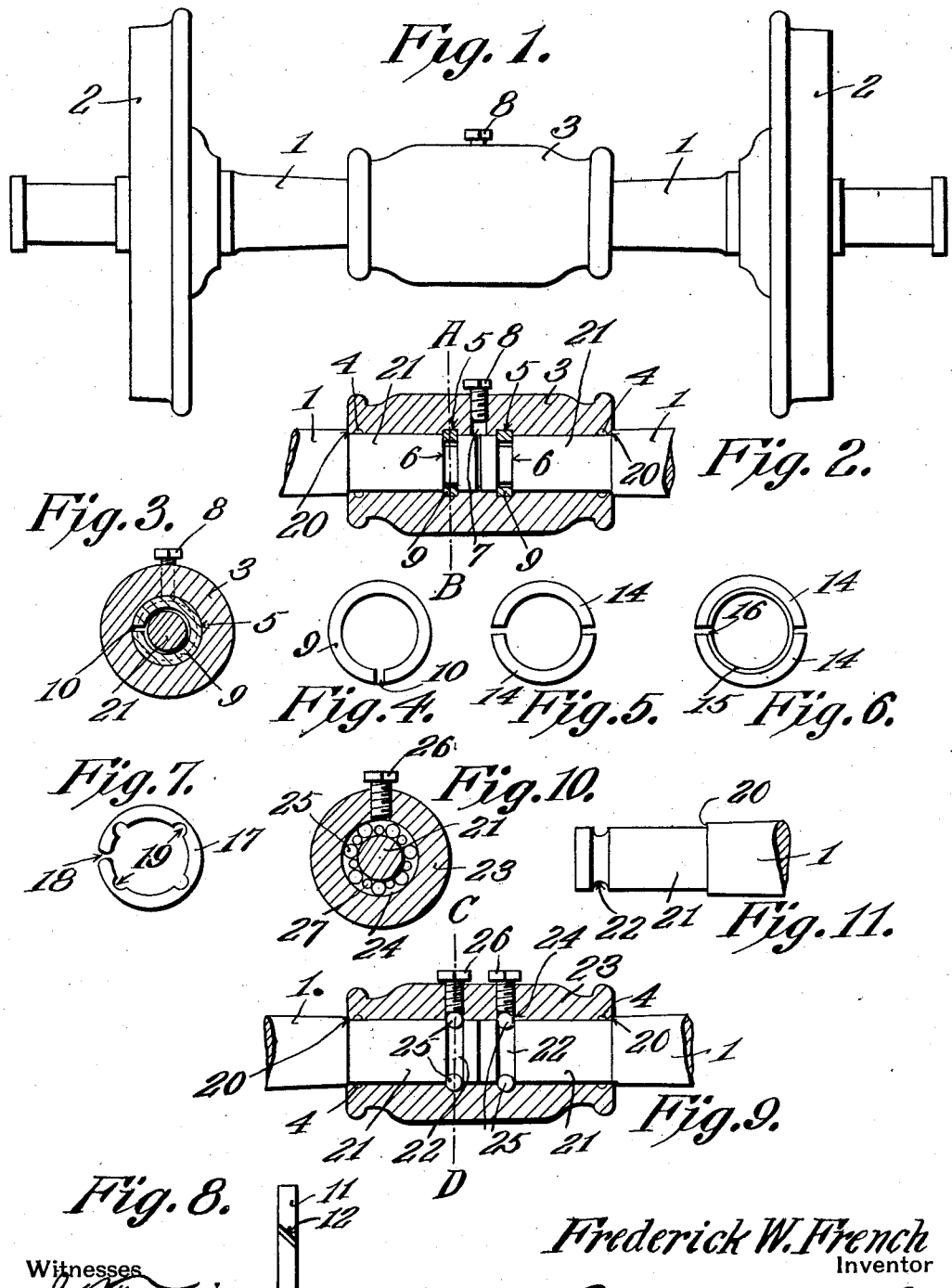

FREDERICK W. FRENCH, OF OAKLAND, CALIFORNIA.

RAILROAD AXLE-COUPLING.

1,009,402. Specification of Letters Patent. Patented Nov. 21, 1911.

Application filed August 30, 1910, Serial No. 579,640. Renewed October 19, 1911. Serial No. 655,640.

*To all whom it may concern:*

Be it known that I, FREDERICK W. FRENCH, a citizen of the United States, residing at Oakland, in the county of Alameda and State of California, have invented a new and useful Railroad Axle-Coupler, of which the following is a specification.

It is the object of this invention to provide an axle, adapted primarily for railway cars, the axle being so constructed that wheels at the ends of the axle may have independent movement, thereby preventing torsional strain upon the axle.

Another object of the invention is to provide novel means for holding the component elements of a two part axle together for rotation.

Another object of the invention is to provide spring means of novel and improved form, adapted to hold the axle sections assembled within an inclosing sleeve.

The drawings show typical embodiments merely, and it is to be understood that changes, properly falling within the scope of what is claimed, may be made without departing from the spirit of the invention.

In the drawings, Figure 1 shows the invention in top plan; Fig. 2 is a longitudinal section, parts being shown in elevation; Fig. 3 is a transverse section on the line A—B of Fig. 2; Fig. 4 is a plan view of one of the expansion rings whereby the axle sections are held united with the sleeve; Fig. 5 is a plan of a modified form of expansion ring; Fig. 6 is a plan of the expansion ring shown in Fig. 5, and the added detail of the spring whereby the expansion ring is distended; Fig. 7 is a plan of a modified form of expansion ring; Fig. 8 is an edge elevation of a modified form of expansion ring; Fig. 9 is a longitudinal section of the modified form of the invention, parts being shown in elevation; Fig. 10 is a transverse section on the line C—D of Fig. 9; and Fig. 11 is a side elevation of one of the axle sections which are employed in the form of the invention shown in Fig. 9.

In the drawings, the axle sections are denoted by the numeral 1, these sections carrying the wheels 2. The adjacent ends of the axle sections 1 are reduced as shown at 21, to define shoulders 20. The adjacent ends of the axles sections 1 are adapted to be inserted into a tubular sleeve 3, the shoulders 20 abutting against the end faces of the sleeve 3, as seen most clearly in Figs. 2 and 9. In the bore of the sleeve 3, adjacent the ends thereof, are annular grooves 4, adapted to receive a packing or the like, to prevent dust and dirt from working into the sleeve. In the bore of the sleeve 3, are spaced annular grooves 5, disposed opposite to annular grooves 6 in the reduced ends 21 of the axle sections 1. The sleeve 3 is provided with a transverse opening 7, communicating with the bore of the sleeve, this opening 7 being adapted to receive a screw 8 or the like, the screw 8 serving as a closure. Through this opening 7 a lubricant may be introduced into the bore of the sleeve 3. The adjacent ends of the axle sections 1 are normally held spaced apart, as clearly shown in Fig. 2. The opening 7 is so positioned, and of sufficient width, that it will discharge both upon the end faces of the axle sections 1, and upon the side faces thereof.

In order to hold the axle sections 1 within the sleeve, resilient elements are employed, these resilient elements being seated, at once, in the grooves 5 of the sleeve 3 and in the grooves 6 of the axle sections 1. These resilient elements may take a variety of forms. For instance, as shown in Fig. 4, they may consist in a simple ring 9, of resilient construction, the ring being split as denoted by the numeral 10. The depth of the grooves 6 in the axle sections 1 is equal to, or slightly greater than the width of the rings 9, so that, when the rings 9 are compressed in the grooves 6, the rings 9 will be housed entirely within the contour of the reduced ends 21 of the axle sections 1. By reason of the fact that the rings 9 may thus be housed within the contour of the axle sections, the reduced ends 21 of the axle sections, together with the rings 9, may be readily thrust into the ends of the sleeve 6. The axle sections 1 are moved toward each other, until the grooves 5 and 6 are brought into vertical alinement, whereupon the rings 9 will expand, entering the grooves 5 in the sleeve 3, and locking the axle sections 1 against removal from the sleeve. At this point, it may be noted that the depth of the grooves 5 in the sleeve 3 is less than the thickness of the rings 9, so that when the rings 9 expand, portions of the rings will still be disposed in the grooves 6 in the axle sections 1, thus holding the axle sections in place.

Another form of ring is shown in Fig. 8. This modified ring, denoted by the numeral 11, is of substantially the same construction as the ring 9, saving for the fact, that, as shown at 12 in Fig. 8, the ring is split diagonally, instead of being split rectangularly, as denoted by the numeral 10 in Fig. 4.

If desired, as shown in Fig. 5, the ring may consist of two sections 14. When the ring is of this form, a spring band 15, split at 16, may be inserted within the contour of the sections 14, to expand the same into the grooves 5 of the sleeve 3.

Another form of ring is shown in Fig. 7. This ring, denoted by the numeral 17 is split as shown at 18, and cut-away upon its inner edge, preferably, although not necessarily, at four points, as shown at 19. By thus cutting away the ring, as shown at 19, the ring may be more easily compressed, so as to be housed within the contour of the grooves 6 in the axle sections 1; and in this connection it may be stated that all of the expansion rings hereinbefore described, are adapted to be contracted in grooves 6 of the axle sections 1, and thus to be housed within the contour of the axle sections, while the said sections are being inserted into the sleeve 3.

Another form of the invention is shown in Fig. 9. As there disclosed, the reduced ends 21 of the axle sections 1 are provided with ball races 22, the modified sleeve 23 shown in Fig. 9 being provided with ball races 24, coöperating with the ball races 22 in the reduced portions of the axle sections. There are spaced openings in the sleeve 23, these openings being alined with the ball races 24, screws 26 or the like, being mounted in the openings. These openings, the screws 26 being removed, serve to provide for the insertion of balls 25 and 27 into the ball races 22 and 24. The balls 25 and 27 are of different sizes, the balls 25 being slightly larger in diameter than the balls 27, the balls 25 and 27 being alternated in the ball races. The supporting strain is thus thrown upon the larger balls 25, the smaller balls 27 serving to separate the balls 25, and to reduce the friction between those balls (25) which carry the weight.

The device shown in Fig. 2 affords a permanent connection between the axle sections 1, while the device shown in Fig. 9 connects the axle sections 1 in such a way that they may be separated at will, the balls 25 and 27 being removable through the openings in the sleeve 23 in which the screws 26 are mounted.

Having thus described the invention what is claimed is:—

1. A device of the class described comprising axle sections and a sleeve to receive the ends of the axle sections, the sections and the sleeve being provided with coöperating grooves; and split, spring rings seated in the grooves, the rings being cut away upon their inner edges at spaced points.

2. A device of the class described comprising axle sections spaced apart at their adjacent ends, and a sleeve to receive the ends of the axle sections, the sections and the sleeve being provided with coöperating grooves; and split, spring rings seated in the grooves, the rings being cut away upon their adjacent edges at spaced points; there being a radial oil opening in the sleeve discharging both upon the end faces of the sections and upon the side faces thereof; and a closure for the opening.

In testimony that I claim the foregoing as my own, I have hereto affixed my signature in the presence of two witnesses.

FREDERICK W. FRENCH.

Witnesses:
H. A. CARMICHAEL,
H. A. THOMAS.

---

Copies of this patent may be obtained for five cents each, by addressing the "Commissioner of Patents, Washington, D. C."